R. LA FRANCE.
MEANS FOR GUIDING MOLTEN GLASS.
APPLICATION FILED JULY 10, 1918.

1,416,725.  Patented May 23, 1922.

INVENTOR
R. La France
By J. F. Rule,
His attorney.

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

MEANS FOR GUIDING MOLTEN GLASS.

1,416,725.      Specification of Letters Patent.      Patented May 23, 1922.

Application filed July 10, 1918. Serial No. 244,135.

*To all whom it may concern:*

Be it known that I, RICHARD LA FRANCE, a citizen of the United States, residing at Toledo, in the county of Lucas and State of Ohio, have invented new and useful Improvements in Means for Guiding Molten Glass, of which the following is a specification.

My invention relates to means for directing charges of molten glass into molds or receptacles, and is particularly designed for use in charging the molds on a continuously rotating machine.

In the manufacture of bottles, tumblers or other articles which are formed in molds, it is customary to transfer the molten glass from the furnace to the molds, either in the form of gobs or charges of the proper size for forming the articles, or to flow the glass in a stream into the molds. Sometimes a combination of these methods is employed. The molds are ordinarily mounted on a machine having a step-by-step rotation so that the molds are brought successively to a charging station and held stationary while the charge of glass is introduced.

A continuously rotating mold carrying machine possesses obvious and important advantages over a machine of the intermittent type, but requires some special provision for directing the glass into the molds as they pass the charging station. An object of the present invention is to provide simple and practical means for accurately guiding the glass to the continuously moving molds.

A preferred construction embodying the invention comprises a series of funnel shaped guides on a rotary carrier, the latter mounted on a glass forming machine to rotate about a vertical axis within the ring of molds on the machine. The funnel guides travel in a circular path above the molds and are successively brought into register with and directly over the successive molds and remain substantially in register with the molds while passing the charging station. The charge of glass drops through the funnel guide and is accurately guided thereby into the mold.

Other objects of the invention will appear hereinafter.

Figure 1:
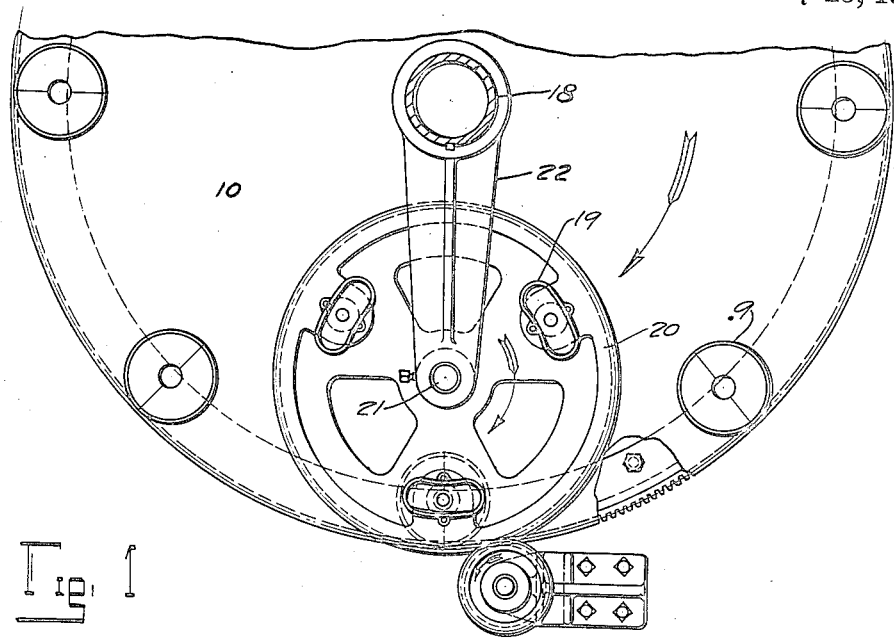

In the accompanying drawings: Figure 1 is a part sectional plan view of a glass forming machine with the present invention applied thereto.

Figure 2:
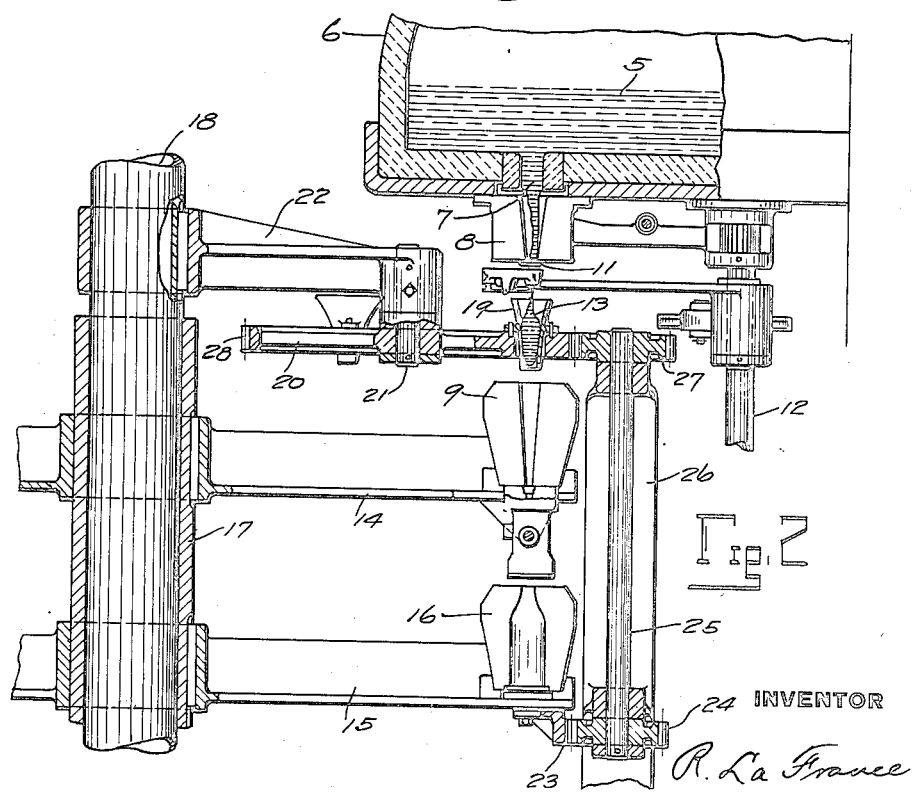

Figure 2 is a sectional elevation showing the machine and gob forming mechanism.

The molten glass 5 may be supplied from a continuous melting tank having a boot or extension 6 thereon. The glass flows in a stream through a discharge opening 7 in the bottom of the boot into a sectional cup 8 in which it accumulates to form individual gobs or charges, which are periodically dropped or otherwise conveyed to the blank molds 9 on a glass forming machine 10. A knife 11 forms a temporary bottom for the divided cup 8. The knife is periodically withdrawn and the cup sections separated by means of cams on a drive shaft 12, thus permitting the accumulated gob of glass 13 to drop, after which the cup sections are brought together and the knife actuated to sever the gob from the oncoming stream and permit a succeeding charge of glass to accumulate in the cup. The gob forming apparatus just described is not, in itself, a part of the present invention. Other forms of apparatus might be used to supply glass either in the form of gobs or otherwise.

The glass forming machine may comprise an upper mold table 14 on which are mounted the blank molds 9 arranged in a ring, and a lower mold table 15 carrying a ring of finishing molds 16 arranged directly beneath the respective blank molds. The mold tables are keyed to a hollow shaft 17 mounted to rotate continuously about a stationary column 18.

The means for guiding the charges of glass to the blank molds comprises a series of funnel shaped guides 19 mounted on a rotary carrier 20, the latter journalled on a stud shaft 21 carried by a stationary arm 22 mounted on the column 18. The carrier 20 may be driven from a ring gear 23 on the mold table 15, said gear meshing with a pinion 24 on a vertical shaft 25 journalled in a standard 26. Keyed to the upper end of the shaft 25 is a pinion 27 in mesh with gear teeth 28 on the carrier 20, the latter as shown being in the form of a gear wheel. The gears are so proportioned that the speed of the funnel guides is substantially the same as that of the molds. Said guides are also so spaced and arranged that each guide is maintained directly over and in register with a mold while the latter is passing a charging station. Each funnel has its mouth or receiving end elongated, as shown in the direction of its travel, thereby lengthening the period during which it is beneath the gob forming cup 8 and in position to guide the gob into the mold.

The guide carrier 20 is arranged with its axis of rotation within the annular path of the molds in order that the direction of movement of the guides while beneath the cup 8, may more nearly coincide with that of the molds, than would be possible if the guides were arranged to revolve in a path outside the path of the molds. Theoretically the direction in which the funnel guide is moving coincides with that of the mold only at one point, but with the arrangement herein shown the direction of the guide and mold practically coincide during the full period of time that the guide is passing beneath the cup 8. The lower end of the funnel guide may be slightly smaller than the receiving opening in the mold 9 to compensate for the slight variations in the relative position of the funnel and mold while passing the charging station.

The arrangement of the guide carrier 20 within the outline of the machine is compact and effects a substantial saving of space that would be required if said carrier were located beyond the mold tables. This arrangement is particularly desirable where the machine must be placed close to the furnace to bring the molds directly beneath the flow opening, and in general where economy of space is a desideratum. Other forms of gearing for driving the carrier 20 might be employed.

Modifications may be resorted to within the scope of my invention.

What I claim is:

1. The combination of a series of molds moving continuously in a closed path, and a series of guides moving continuously in a different path within said first mentioned path and brought successively into position to register with the successive molds.

2. The combination of a series of molds moving continuously in a closed path, a series of guides moving continuously in a different path within said first mentioned path and brought successively into position to register with the successive molds, and means to feed charges of molten glass to said guides and molds.

3. The combination of an annular series of molds, an annular series of guides, means to revolve said series of molds, and means to revolve said series of guides in a path within the path of the molds and bring the guides successively into register with the successive mold, the guides being shaped and adapted to guide molten glass into the molds from a position out of line with the molds.

4. A glass forming machine comprising a series of molds, means to revolve said series of molds about a vertical axis, a series of guides, and means to revolve said series of guides about an axis within the circle of revolution of said molds and eccentric to said first mentioned axis, the guides being funnel shaped with their flared tops elongated in the direction of travel.

5. A glass forming machine comprising a series of molds, means to revolve said series of molds about a vertical axis, a series of guides, and means to revolve said series of guides about an axis within the circle of revolution of said molds and eccentric to said first mentioned axis, said guides being driven at the same speed as the molds and arranged to be brought successively over and in register with the molds, the guides being shaped and adapted to guide molten glass into the molds from a position out of line with the molds.

6. The combination of an annular series of molds, means to continuously rotate the molds about a central axis, a guide, and means to revolve said guide in a path within the path of the molds and about an axis eccentric to that of the molds, and thereby to bring said guide periodically into register with one of the molds, the guide being shaped and adapted to guide molten glass from a stationary source into a moving mold for an appreciable time.

7. A glass forming machine comprising in combination a central stationary column, a mold carriage mounted to rotate about said column, molds on said carriage, a carrier supported on said column and rotatable about an axis within the path of the molds and eccentric to said column, and funnel-shaped guides on said carrier brought successively into register with the molds.

8. A glass forming machine comprising in combination a central stationary column, a mold carriage mounted to rotate about said column, molds on said carriage, a carrier supported on said column and rotatable about an axis within the path of the molds, and an upwardly flaring guide on the carrier brought periodically into register with a mold.

9. A glass forming machine comprising a series of molds, means to revolve said series of molds about a vertical axis, a series of guides, and means to move said guides within the circle of revolution of said molds, said guides traveling at the same rate of speed as the molds and arranged to be brought successively over and in register with the successive molds.

10. The combination of a series of molds moving continuously in a closed path, and a series of guides moving in a different path within said first mentioned path and brought successively into position to register with the successive molds and remaining in register during a predetermined period of their travel.

11. The combination of a series of molds moving continuously in a closed path, a series of guides moving in a different path within said first mentioned path and brought successively into position to register with the successive molds, and means to feed charges of molten glass to said guides and molds.

12. A glass forming machine comprising, in combination, a central stationary column, a mold carriage mounted to rotate about said column, molds on said carriage, a carrier supported on said column and rotated about an axis within the path of the molds, and an annular series of upwardly flaring guides on the carrier brought successively into register with the successive molds.

13. The combination with means to supply charges of molten glass, of a series of molds moving continuously in a closed path and brought successively beneath said means, and a series of guides moving continuously in a different path within said first mentioned path and brought successively into a position beneath the supply means and over the successive molds to register therewith while beneath said supply, said guides formed to direct the charges of glass into the molds.

14. The combination of an annular series of molds, an annular series of guides, means to revolve said series of molds, means to revolve said series of guides in a plane above the molds and in a path within the path of the molds and bring the guides successively into register with the successive molds, and means to supply charges of molten glass and drop the glass from a point over the guides while the latter are in register with the molds, said guides being shaped to remain in receiving position for a predetermined period of their travel and remaining in register with the molds during said period.

15. The combination with means to supply and drop charges of molten glass at a mold charging station, a glass forming machine comprising a mold carriage rotating continuously about a vertical axis, an annular series of molds carried thereby and brought successively to the charging station, a series of guides, and means to revolve said series of guides about an axis within the circle of the molds and eccentric to the axis of the mold carriage, said guides being driven at substantially the same speed as the molds and brought successively over the molds to register therewith while passing the charging station, said guides being shaped to present to the glass a receiving and guiding surface extended in the direction of its travel to remain in guiding position beneath the point of supply during a predetermined period of their travel.

16. The combination of a series of molds, means to move the molds in an annular path, a series of funnel shaped guides, means to move the guides at the same linear speed in a smaller annular path about an axis within the mold path, the guide path passing over the mold path at one point, and a glass supply means above said point.

Signed at Toledo, in the county of Lucas and State of Ohio, this 5th day of July, 1918.

RICHARD LA FRANCE.